United States Patent [19]

Fujii

[11] Patent Number: 4,579,908

[45] Date of Patent: Apr. 1, 1986

[54] RELEASE AGENT COMPOUND FOR FIXING DEVICE IN ELECTROPHOTOGRAPHIC COPYING MACHINE

[75] Inventor: Yoshihalu Fujii, Sakurai, Japan

[73] Assignee: Sharp Kabushiki Kaisha, Osaka, Japan

[21] Appl. No.: 613,228

[22] Filed: May 23, 1984

[30] Foreign Application Priority Data

May 30, 1983 [JP] Japan .................................. 58-97297

[51] Int. Cl.$^4$ ...................... C08G 47/10; C08G 43/02; C08F 33/08

[52] U.S. Cl. .................................................... 525/106

[58] Field of Search ......................................... 525/106

[56] References Cited

U.S. PATENT DOCUMENTS 3,737,479 6/1973 Haaf .................................... 525/106

*Primary Examiner*—John Kight

*Assistant Examiner*—M. L. Moore

*Attorney, Agent, or Firm*—Birch, Stewart, Kolasch & Birch

[57] ABSTRACT

A release agent for removing offset toner particles from the surface of a fixing roller of an electrophotographic copying machine comprises a dimethyl silicone oil, as a principal agent and contains polypropylene in the amount of about 1 weight % or less. The compatibility between the toner particles and the polypropylene is so small that the offset toner particles are easily separated from the silicone oil. The toner particles are preferably made of acrylic-styrene resin epoxy resin, or the like, or mixture thereof.

2 Claims, 1 Drawing Figure

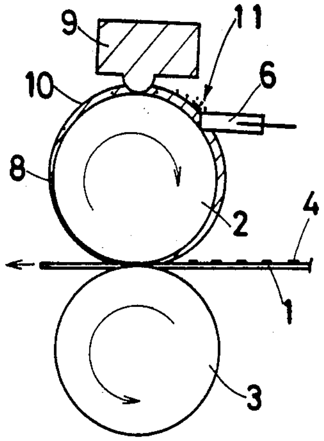
9
11
10
6
8
2
4
1
3

RELEASE AGENT COMPOUND FOR FIXING DEVICE IN ELECTROPHOTOGRAPHIC COPYING MACHINE

BACKGROUND OF THE INVENTION

The present invention relates to an electrophotographic copying machine and, more particularly, to a release agent compound for a fixing device in an electrophotographic copying machine.

An electrophotographic copying machine produces on a photoreceptor an electrostatic latent image corresponding to an image of a document such as a manuscript or book to be copied. Toner particles are electrostatically attracted to the latent image, so that the latent image becomes visible as a toner image. The toner image on the photoreceptor is transferred onto a copy paper via a transfer charger. The remaining toner particles and charge remaining on the photoreceptor, after the transfer, are removed in preparation for the next copying operation.

In a conventional fixing device for the copying machine, a toner image transferred is fixed to the copy paper by passing the copy paper between a heated fixing roller, and an elastic pressure such as a rubber roller. Unfortunately, while the paper with the toner image is passing between the heated fixing roller and the elastic pressure roller, the paper has a tendency to stick to both of the rollers, causing various problems such as incomplete fixing, and forming of a double image due to the adherence of toner particles to the fixing roller rather than the copy paper (this phenomenon is generally referred to herein as "offsetting"), and malfuction of the copying machine.

While various methods have been proposed for solving these problems, the most useful method is for an applicator to coat a release agent, such as a silicone oil, on the fixing roller and the elastic roller. However, the generally employed toner particles will dissolve in conventionally used silicone oil release agents so that it is difficult to effectively prevent the offsetting.

SUMMARY OF THE INVENTION

Accordingly, it is an object of the present invention to provide an improved compound as a release agent, which release agent applicator coats over the surface of a fixing roller in an electrophotographic copying machine.

It is another object of the present invention to provide an improved silicone oil compound suitable for a release agent to be coated on a fixing roller and a follower roller in an electrophotographic copying machine.

Briefly described, in accordance with the present invention, a release agent suitable for use in an electrophotographic copying machine comprises a dimethyl silicone oil as the principal agent, and a polymer, such as polypropylene, in the amount of about 1 weight % or less. A toner preferably employed is made of an acrylic-styrene resin. The compatibility between polypropylene and acrylic-styrene resin is so poor that the acrylic-styrene resin toner particles are very difficult to dissolve in the release agent. Therefore, the offset toner particles can be separated from the release agent. It may be possible for the toner particle resin to be polyethylene epoxy or the like, or a mixture thereof.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a side view of a fixing device with a release agent applicator used for coating the release agent of the present invention.

DESCRIPTION OF THE PREFERRED EMBODIMENTS

According to the present invention, the release agent to be coated on a fixing roller comprises a dimethyl and silicone oil as a principal agent containing a polymer, such as polypropylene, in the amount of about 1 weight % or less. The generally used toner particles are preferably made of an acrylic-styrene resin, in which the mutual solubility or compatibility between the toner particles and the polypropylene is very poor. It is generally understood that the low compatibility therebetween results from the difference of the molecular cohension energy or solubility parameter. The solubility parameter of polypropyelene is about 7.9–8.1 while that of the acrylic-styrene resin is about 8.9–9.1, so that the difference is about 1.0. For reference, the solubility parameter of the dimethyl silicone oil is about 5.9.

Even if the acrylic-styrene resin toner particles are dissolved in the release agent comprising the dimethyl silicone oil, the toner particles can be readily removed from the dimethyl silicone oil because (1) the compatibility between the acrylic-styrene resin toner particles and polypropylene is very poor, and (2) even if some of the resin toner particles are dissolved in the silicone oil, as the fixing roller is heated up to the fixing temperature of about 200 degrees Centigrade, the polypropylene becomes easier to dissolve and disperse in the dimethyle silicone oil, so that its effectiveness as a release agent for the acrylic-styrene resin becomes further enhanced.

It may be possible that, each of a polyethylene resin and, further, epoxy resin (solubility parameter: about 10.1) or like can be used as the toner particles. It may be further possible that any mixture of these resins can be used as the toner particles.

FIG. 1 is a side view of a fixing device and provision for coating a release agent according to the present invention.

Referring to FIG. 1, a fixing device used for the present invention comprises a fixing roller 2, a rubber pressure roller 3, an oil applicator 9, and a cleaning blade 6. A copy paper 1 carrying an image 4 formed with toner particles is transported and passed through the clearance between the rollers 2 and 3. Offset toner particles 8 are inevitably separated from the surface of the copy paper 4 and carried around the roller 2.

The oil applicator 9 contains the release agent of the present invention and is positioned at the top of the roller 2. The oil applicator 9 provides the release agent to coat the surface of the roller 2, as designated by numeral 10. The cleaning blade 6 is provided adjacent the oil applicator 9 and pressed toward the surface of the roller 2 for assuring a uniform coating of the release agent 10 and removing the collection of offset toner particles 11.

The offset toner particles 8 are dissolved in the release agent 10. However, according to the low compatibility of the toner particles and polypropylene of the present invention, the dissolved toner particles will be released or separated from the silicone oil with the help of the heating of the fixing roller 2 up to about 200 degrees Centigrade. The toner particles separated from the silicone oil are combined with one another. The offset toner particles thus combined are scraped from the surface of the roller 2 by the cleaning blade 6.

It may prove that a small amount of the release agent according to the present invention, enables the collection of a great quantity of offset toner particles. If the silicone oil alone is used, about 10 g of silicone oil is needed per million copy papers. According to the release agent of the present invention containing polypropylene of the present invention, about 4 g of the release agent is enough to remove the offset toner particles formed by one million copy papers.

While only certain embodiments of the present invention have been described, it will be apparent to those skilled in the art that various changes and modifications may be made therein without departing from the spirit and scope of the present invention as claimed.

What is claimed is:

1. A release agent compound for the removal of offset toner particles from the surface of a fixing roller of an electrophotographic copying machine, consisting essentially of dimethyl silicone oil; and polypropylene in an amount of about 1% by weight or less whereby the presence of said polypropylene increases the incompatibility of said toner particles for said silicone oil.

2. A method of separating offset toner particles from a release agent composition which is applied to a surface of a fixing roller of an electrophotographic copying machine during copying thereby enhancing the quality of a copy image which comprises:

providing a release agent composition consisting essentially of dimethyl silicone oil and polypropylene in an amount of about 1% by weight or less, whereby the presence of said polypropylene increases incompatibility of said toner particles for said silicone oil, coating said release agent on the surface of said fixing roller during fixing of said toner particles in an imagewise configuration to the surface of a copy paper whereby during said fixing step some toner particles adhere or are offset to said surface of said fixing roller, remaining in said release agent composition, and removing said offset toner particles from said release agent composition by a cleaning blade.

* * * * *